Oct. 2, 1962  W. T. RENTSCHLER  3,056,496
MEASURING AND SORTING DEVICE
Filed July 16, 1958  4 Sheets-Sheet 3
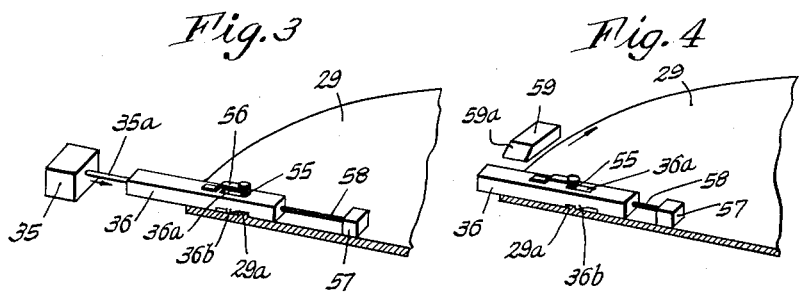
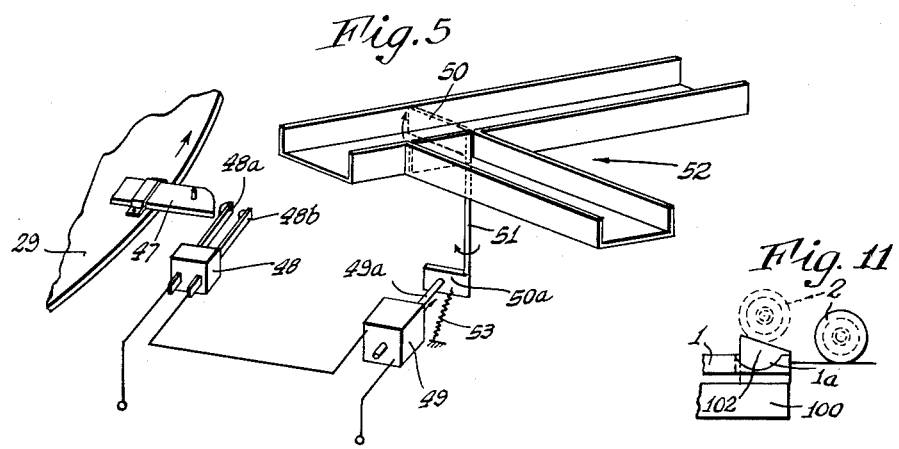
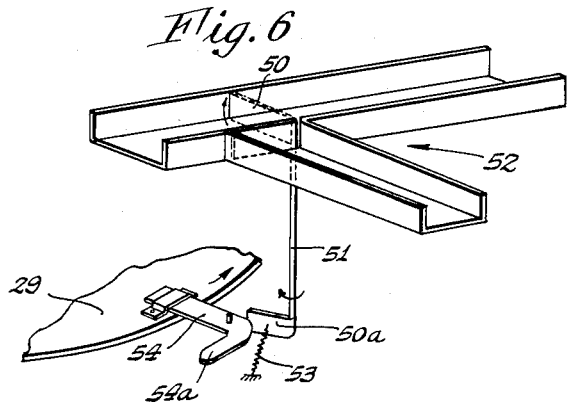
INVENTOR.
Waldemar T. Rentschler
BY
Munn, Liddy, Daniels & March
ATTORNEYS Oct. 2, 1962 W. T. RENTSCHLER 3,056,496
MEASURING AND SORTING DEVICE
Filed July 16, 1958 4 Sheets-Sheet 4
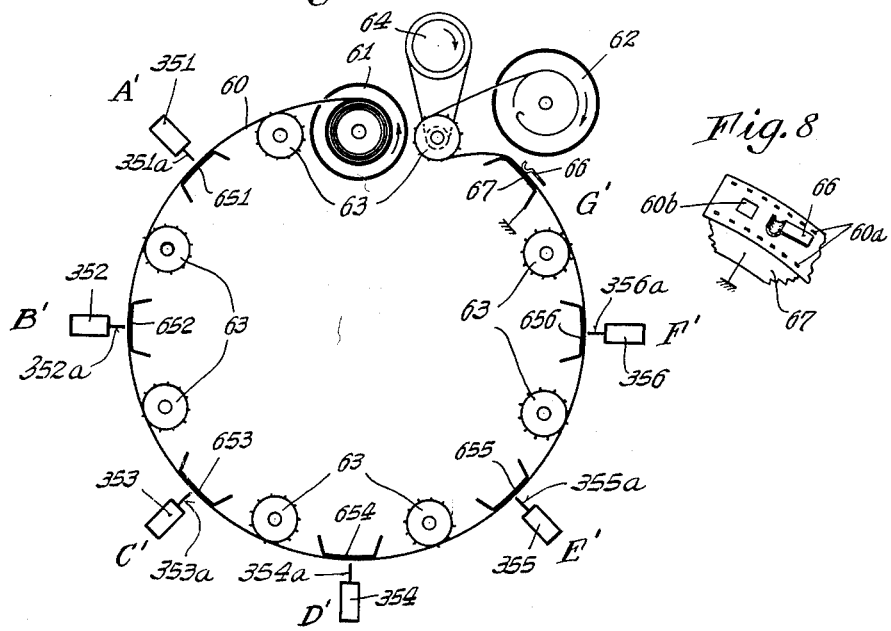
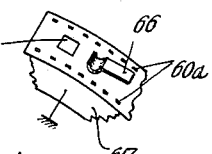
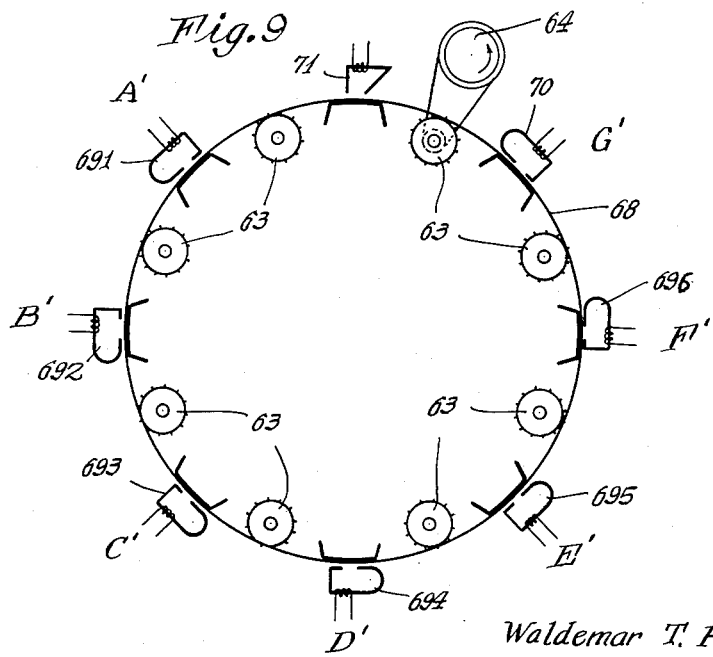
INVENTOR.
Waldemar T. Rentschler
BY
Munn, Liddy, Daniels & March
ATTORNEYS

United States Patent Office 3,056,496
Patented Oct. 2, 1962

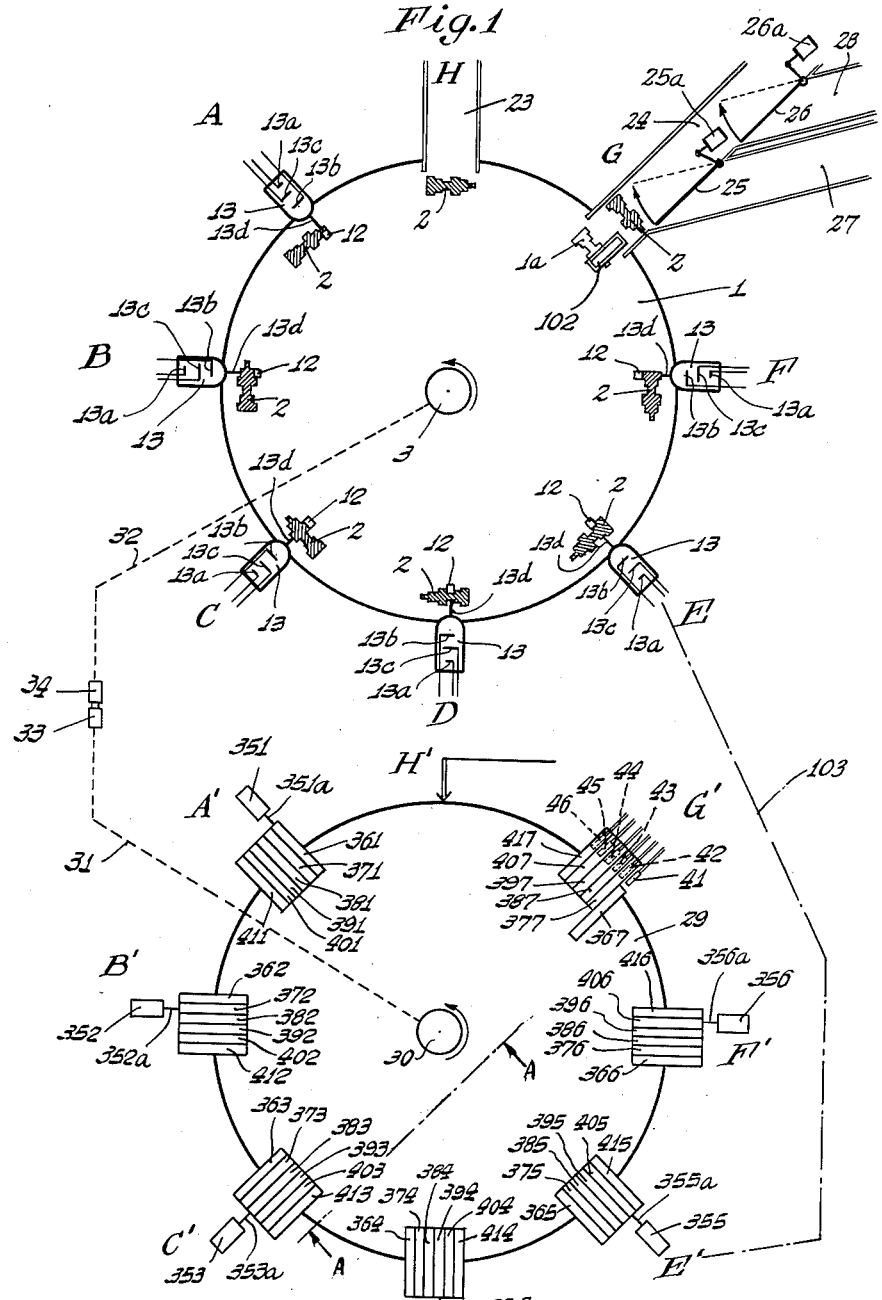

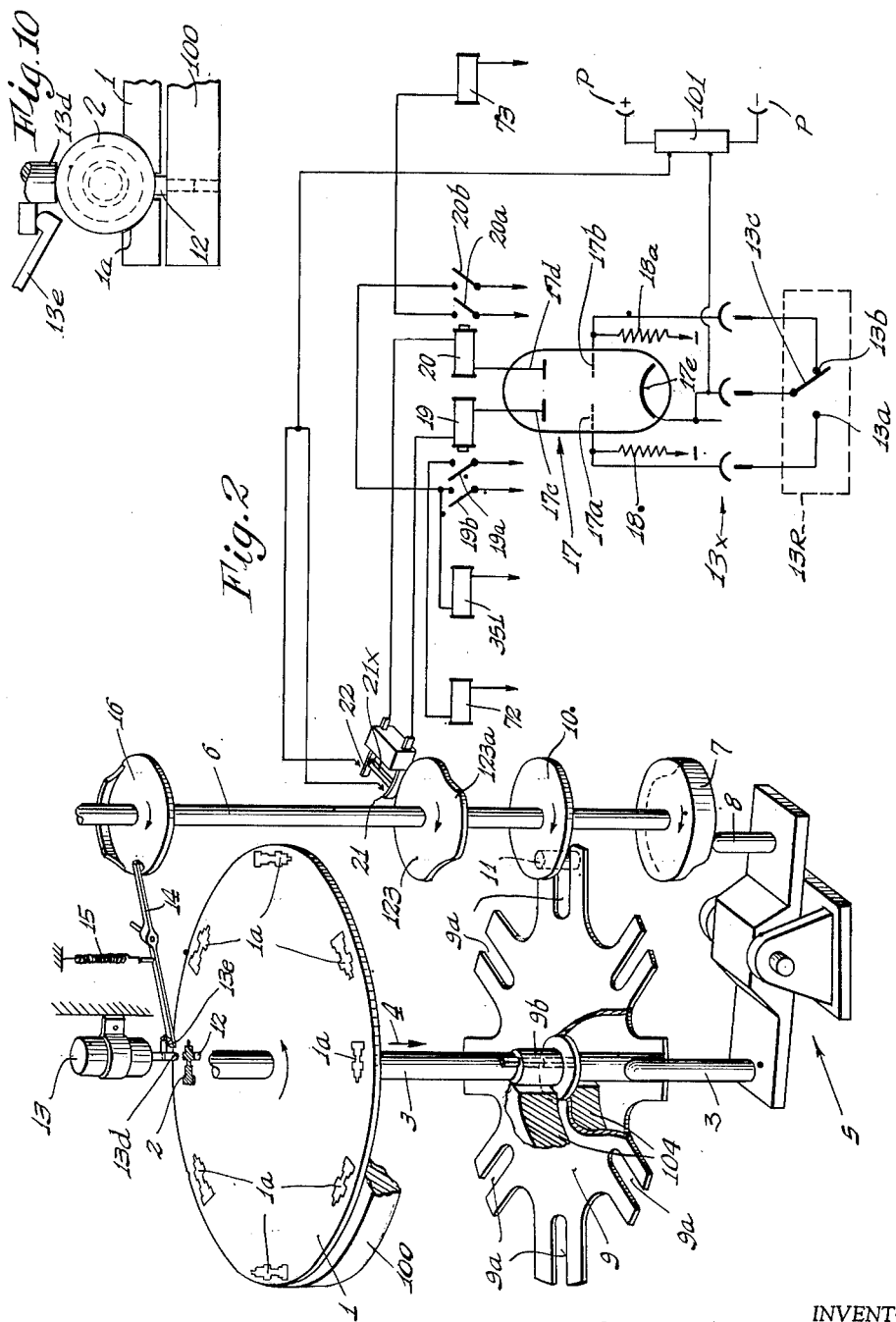

3,056,496
MEASURING AND SORTING DEVICE
Waldemar T. Rentschler, Calmbach (Enz), Germany, assignor to Alfred Gauthier, G.m.b.H., Calmbach (Enz), Germany, a corporation of Germany
Filed July 16, 1958, Ser. No. 749,002
Claims priority, application Germany July 24, 1957
15 Claims. (Cl. 209—82)

This invention relates to measuring and sorting devices of the type having a number of measuring stations to which workpieces are carried one after another by means of a power-operated and controlled carrier device.

Measuring and sorting devices of this type are intended for use in checking and/or controlling the production of workpieces which require that certain dimensions or tolerances, or similar predetermined properties or qualities be maintained, and where it is not possible or desirable to check or test the various measurements, tolerances and the like by a single operation. Use is made of the information obtained at the measuring stations generally in two different ways. One way, that usually the simplest, involves rejecting the workpiece or excluding it from further measuring or checking operations immediately upon it being discovered that the workpiece is defective in one manner. Such exclusion is therefore made before succeeding measuring or checking operations are performed on the workpiece. The end of a complete cycle involving all of the necessary checks or measurements is reached only by those workpieces which pass each and every one of the tests or checks at the various measuring stations. In contradistinction to this method of checking, the other method embraces subjecting every workpiece to all of the measuring or checking operations at the various measuring stations, and then either passing or rejecting all of the workpieces at the end of the entire measuring or checking cycle, regardless of how many incorrect measurements were found and regardless of where these measurements were discovered. This type of checking and sorting of workpieces has the advantage that with each workpiece all of the conditions of quality which are involved, are checked or tested, so that the quality or condition of each workpiece of the entire lot can be completely learned and recorded. The final sorting of the workpieces at the point where they leave the movable carrier is then done in accordance with the indications received at all of the measuring stations, such information being both indicated and stored at the individual measuring stations. However, with previous well-known devices utilized with the above apparatus, the storage of the measured values is done in a complicated manner, involving extensive equipment and appreciable cost. Moreover, in the construction, testing and operation of such storage devices workers having special skills are required, so that the fabrication of such devices not only is costly but the application and use of the devices rendered more difficult. In addition, the complicated equipment which is utilized is subject to malfunctioning, requiring downtime of the apparatus and upkeep which would not occur where simpler and more reliable equipment is used.

An object of the present invention is to provide a novel and improved measuring or checking and sorting device of the type above outlined, wherein all of the workpieces are subjected to various checks at all of the measuring stations, and wherein the storage of the information obtained from the measurements and checking operations performed at the stations as well as the utilization of the stored information is carried out in an extremely simple, reliable, inexpensive and easily understood manner, with simple and inexpensive equipment which is especially trouble-free and which does not require the attendance of skilled workers.

The above object is accomplished, in accordance with the invention, by the provision of a plurality of information-transmitting devices which are co-ordinated respectively with the said measuring stations to be influenced or controlled by the respective measuring devices disposed at the said stations. A movable carrier for the workpieces is provided, by which the same are carried in a progression so as to traverse the plurality of measuring stations one station after another, and I further provide an information-storage device which is movably arranged and under the control of said movable carrier for the workpieces. Such storage device receives at the various measuring stations information gained by the respective measuring devices, as regards the dimensions, tolerances and quality of the workpieces, said information being transferred to the storage device by the said information-transmission devices which are co-ordinated with the measuring stations. At the end of the measuring cycle the information stored by the storage device is taken off and utilized by an information-receiving device, and the latter controls or actuates a control means which operates a selector device at the discharge station of the apparatus, for sorting the workpieces according to whether or not they are acceptable.

An outstanding and important advantage of the present invention resides in the particular organization provided, by which a direct, readily perceptible connection exists between the workpiece which is being measured or checked and the information storage means by which the results of such checking are recorded or stored as the workpiece progresses from one measuring station to the next. The information storage devices are moved or made to progress concurrently or in step with the progressing movements of the workpieces, thereby to collect successively and in a simple manner all of the information regarding the quality of the workpieces as such information is obtained at the various measuring stations. By such organization, at any moment in the measuring cycle there exists a reversible, unequivocal co-ordination between the workpiece and the location at which the information storage means co-ordinated to the workpiece is disposed; the said storage means is thus always directly recording or storing the data relating to the quality of the workpiece, as such data is compiled and supplemented. Therefore, by such organization the information being built up which constitutes the "information picture" of the particular workpiece during the progress of the same through the measuring cycle can be immediately directly perceived, and the clarity with which the stored information is available and may be seen is unsurpassed, as well as the simplicity of the structures involved and the reliability of the operations performed thereby.

In accordance with the invention a saving of components is effected in the present device and desirable simplicity of the structure is obtained by locating the information storage means adjacent the movable carrier for the workpieces, so that such storage means may be controlled with the carrier and moved conjointly therewith. Therefore, no separate drive is required to advance the information storage means, but instead the workpiece carrier and the information storage means can be driven both as a single unit; by such organization the utmost reliability is had in the coordination between the workpieces and the information storage means.

As an alternative construction the information storage means may be mounted on a special, separate carrier which is moved in synchronism with the movement of the workpiece carrier, and this arrangement permits the greatest possible freedom or flexibility to be had in the structure of the workpiece carrier and the arrangement of the measuring devices which are coordinated with the individual measuring stations. Also, a special advantage is had by such arrangement since the fabrication processes, assembly of the various devices, etc. may be performed in a manner consistent with good manufacturing practice. Such synchronized movements of the special separate carrier for the storage means may be effected, for example, by a disengageable mechanical gearing, by an electrical coupling or shaft, or by an electromagnetic-mechanical stepping type control device. A fixed supporting frame may be provided for the said separate carrier, which mounts the information storage means, and such fixed frame may conveniently carry the means, co-ordinated to the measuring stations, which activates the said storage means. Such frame may also advantageously support the control means which is responsive to the information storage means and which actuates the selector device by which the workpieces are ultimately sorted. The activating devices for the said storage means may be arranged to operate in the same sequence that the measuring stations are traversed by the workpieces. Each such activating device is connected with a separate one of the measuring devices located at the measuring stations, preferably by electrical power-carrying connections.

By the provision of the separate movable carrier for the storage means there is a further advantage in that the apparatus may be constituted as two different enclosed units, namely the measuring or checking unit and the information storing unit. By such construction the two units may be manufactured separate from each other and preferably in greater volume, and the units may be later coupled to each other in accordance with the particular requirements of the task. Also, a greater utility is obtainable, since several measuring or checking units may be utilized one after another with a single information storing unit, which could be available then for use with any measuring unit as desired or required. Additionally, any servicing may be more readily carried out, since a greater simplicity is had where the apparatus is divided into distinct units.

The information storage, in accordance with the present invention, can be effected in various ways. A particularly advantageous organization is that where the measuring devices are constituted for example so as to actuate switches by which electrical signals are effected, for controlling electromagnets which may then be constituted as the information transmitting devices. The information storage means may then consist of actuatable parts which may be operated by the said electromagnets, as by mechanically shifting or changing the said parts when the electromagnets are energized.

An important advantage of this arrangement is that the information storage is effected mainly by mechanical means, resulting in an extremely simple construction of the storage means and a reliable operation thereof while at the same time enabling the stored information to be readily observed at any time.

Simplicity, reliability of operation and freedom from servicing are all obtained in the above construction when the information storage means consists of movable parts such as slides or levers, which by means of the electromagnets can be shifted from original, given positions, into other indicating positions wherein they may be temporarily held.

In order to enable the storage means to be used repeatedly with other successive workpieces, as well as to provide for an automatic operation of the apparatus, the movable storage parts or slides may be automatically returned to their original positions at the end of each measuring cycle, and before the new measuring cycle in commenced.

In connection with the above outlined structures, I have found that a desirable reliability of operation is obtained when the movable storage parts or slides are normally held under spring action in their original positions and are held by releasable locking devices when shifted to the indicating positions by means of the electromagnetic activating devices. Also, a reliable operation and simple construction is obtained where the movable storage parts or slides are not dependent on spring action but instead may be frictionally retained in either their original positions or their shifted, indicating positions. With both of these arrangements the return of the slides after they have been activated by the electromagnets may utilize the movement of the separate movable carrier for the storage means, in conjunction with a fixed abutment or shoulder, the latter for example acting either to release the locking devices so that the slides are returned under spring action, or else directly mechanically shifting and returning the slides bodily to their original positions.

In another construction as provided by the invention the storage device may be constituted as a band or flexible strip, into which holes can be punched by means of the electromagnets which constitute the activating means for the storage band. This construction has the special advantage that the indicated measurements or checks, that is, the indicated information obtained from the workpieces, may be retained in the form of a record, at little cost and requiring only small space, and may be kept as long as desired so as to be available at any later time, for revising or statistical purposes and the like.

Moreover, the said stored information can be then taken off the storage band in a simple, easily understood and reliable manner by constituting the information receiving device as a mechanical tracer or feeler.

For the purpose of providing a flexible arrangement of the selector devices which are actuated by the control means or tracing means, said means may be advantageously constituted as one or several parts of an electrical switch arrangement adapted to control the selector devices by electrical power means such as electromagnets and the like.

A simple and direct-acting mechanism may be obtained by constituting the selector devices as movable vanes or blades, and by directly actuating such vanes by the control means which may be constituted as a shiftable part or projection mounted on the separate carrier which is provided for the information storage means.

In order to insure the correct sorting of the workpieces as effected by the selector vanes or blades above mentioned, the construction and arrangement of the storage means and control means mounted on the separate movable carrier may result in the vanes being rendered operative only for a predetermined minimum time during the measuring cycle.

Further, a desirable reliability of operation may be obtained even while utilizing a multiplicity of stored bits of information, and also the elimination of parts which are subject to mechanical wear is obtainable when the control means which responds to the information storage means is constituted as a light source and a photoelectric device is arranged to be responsive to the light from such source.

In another construction provided by the invention the information storage means may be constituted as an endless magnetic belt or band, and the information transmitting means which activates the storage means may comprise transducer heads which may be rendered operative by electromagnets controlled by the measuring devices at the measuring stations. Also, the control means which is responsive to the information storage means may comprise a transducer head, arranged along the endless band beyond the activating or magnetizing transducer heads. Further, between the last transducer head which constitutes the control means for the selector device and the first transducer head for activating the storage means an erasing head may be provided, by which the information carried by the band is obliterated, to enable the band to be in continuous use in connection with an indefinite number of workpieces.

There is also provided by the invention one or several electromagnetic counters which may be co-ordinated with each measuring station of the apparatus, in order to provide in an advantageous manner a statistical control and indication of the quality of the workpieces which are being checked and sorted.

Various embodiments of the invention are illustrated in the accompanying drawings, in which:

FIGURE 1 is a diagrammatic showing of a measuring and sorting device or apparatus as provided by the invention. Two units are shown in this figure, connected with each other for simultaneous operation, one unit constituting a measuring or checking device wherein workpieces are conveyed so as to traverse a plurality of measuring stations one after another, whereas the other unit is constituted as an information storage device where the measurements or results obtained at the various measuring stations of the first unit are indicated and stored for use in sorting the workpieces, and also for statistical and other purposes.

FIG. 2 is a diagrammatic representation, partially in perspective, of the apparatus of the invention showing the mechanism for effecting the advance of the workpieces from one measuring station to another and showing a sensitive relay means, together with counters as controlled by the measuring devices located at the measuring stations.

FIG. 3 is a fragmentary view partly in perspective and partly in section on line A—A of FIG. 1, showing a slide part constituting a portion of the information storing means of the invention, and showing an activating means in the form of an electromagnet, for operating the said slide.

FIG. 4 is a view somewhat similar to that of FIG. 3, but showing the means by which there is effected the return movement of the slide constituting a portion of the information storage means.

FIG. 5 is a perspective diagrammatic showing of one type of sorting means provided by the invention, wherein a movable vane or blade is actuated by an electromagnet which is in turn controlled by an electrical switch operated by a slide member, the latter being constituted as a portion of the information storage means.

FIG. 6 is a view similar to that of FIG. 5, but showing a sorting vane or blade arranged to be directly actuated by a projecting slide part which constitutes a portion of the information storage means of the apparatus.

FIG. 7 is a diagrammatic representation of an information storage unit as provided by the invention, illustrating a modification thereof. Such information storage unit is different from that shown in FIG. 1, and is constituted as a band or flexible strip into which holes are punched by means of electromagnets.

FIG. 8 is a fragmentary diagrammatic showing of the flexible band of FIG. 7 in conjunction with a contact spring adapted to cooperate with holes provided in the band.

FIG. 9 is a diagrammatic view of another modification of the invention, showing a third type of construction for the information storage unit. In this construction an endless magnetic band is provided in cooperation with transducer heads and an erasing head.

FIG. 10 is an elevational view of a workpiece and its rotary carrier, and a stationary measuring table and the carrier for the latter, located at one of the measuring stations.

FIG. 11 is an elevational view of a workpiece and its carrier, and a stop or abutment for discharging the workpieces at the discharge station.

Referring now to FIGURES 1 and 2 there is illustrated a rotary carrier 1 for workpieces, in the form of a dial or conveyance plate, said carrier being power actuated as will be described later in detail. The dial or carrier plate 1 is provided with holding devices for workpieces 2, such devices being shown as recesses 1a having a contour such that they readily accommodate the workpieces 2 which are to be measured and sorted. The conveyance plate or dial 1 is carried by a shaft 3 which is so mounted that it is axially shiftable as well as turned, such axial movement being opposed by a spring (not shown) which provides a bias on the shaft in the direction of the arrow 4 (FIG. 2). In this figure, axial movement of the shaft 3 is effected by a seesaw or lever 5 which in turn is operated in response to turning of a control shaft 6. For such operation, the shaft 6 is provided with a bell-cam 7 arranged for engagement with a pin 8 which is fixedly carried by the seesaw 5.

For the purpose of rotatably advancing the carrier plate or dial 1 a Geneva movement is provided, comprising essentially a Geneva stop member 9 carried by and splined to the shaft 3 as shown, said member being turnable with the shaft but not axially movable. The Geneva stop member 9 is provided with the usual slots 9a adapted to receive the pin 11 of a driving disc 10 which is rigidly secured to the control shaft 6. As will be readily understood, the Geneva stop member 9 may be carried by a bushing 9b and prevented from shifting axially by the provision of fixed stops 104, which are shown herein. By virtue of the relationship between the driving plate 10 for the Geneva movement and the bell cam 7 it will be understood that rotation of the dial 1 will be effected only when it and the member 9 are in a raised position as effected by the said cam and the seesaw 5, such raised position placing the member 9 in the path of movement of the pin 11, and being attained against the action of the spring whose force is indicated by the arrow 4 (FIG. 2).

When the dial 1 is in its raised position the workpieces 2 will be engaged therewith in the recesses 1a, and will be carried along between the various measuring stations as the dial turns. If however the dial 1 is in a lowered positions, the workpieces 2 will rest on measuring tables 12, FIG. 10, only one of such tables being shown in FIG. 2 whereas all said tables are indicated in FIG. 1. The measuring tables 12 are preferably constituted of hardened and ground metal stock in order to insure an accurate surface against which the workpieces may rest for the purpose of checking or measuring the same. In FIGURE 1 six of the measuring tables 12 are shown, one at each of the measuring stations A, B, C, D, E and F, and at each different station a different portion of the workpiece is indicated as in engagement with a measuring table 12 whereby different dimensions of the workpieces may be checked.

At the measuring stations A through F measuring devices or tracers 13 are provided for engagement with the workpieces 2. Two such measuring devices are illustrated in FIG. 2, whereas six such devices 13 are shown in FIG. 1. For the purpose of clarity of illustration, the measuring devices are shown in FIG. 1 as being horizontally disposed, whereas actually as indicated in FIG. 2 they are arranged vertically. Each measuring device 13 in a well known manner may have adjustable stationary contacts 13a and 13b engageable with a movable contact 13c, said adjustable contacts being positionable in accordance with oversize and undersize dimensions of the workpieces 2. The movable contact 13c is mechanically connected (as shown by the broken lines 103 in FIG. 1) with a tracing pin or plunger 13d normally held raised and which, when released and under the action of a spring is urged downward as viewed in FIG. 2 into engagement with the workpiece 2. The release of the tracing pin or plunger 13d for the purpose of effecting such engagement to carry out a measurement of the workpiece is accomplished only when the carrier plate or dial 1 is in its lowered position, with the workpieces 2 resting against the respective measuring tables 12. In effecting this, a driving lug 13e is provided on the tracing pin or plunger 13d, said lug being engageable with a lever 14 arranged under the action of a spring 15 which biases the lever 14 so as to maintain the tracing pin or plunger 13d out of engagement with the workpiece 2. A bell cam 16 is provided on the control shaft 6, for actuating the lever 14 against the action of the spring 15 whereby the lever moves away from the lug 13e setting the tracing pin 13d free so that the spring (not shown) acting on the pin may bring it in engagement with the workpiece 2. It will be understood that the bell cam 16 is properly related to the cam 7 and the driving disc 10 on the shaft 6 to effect a proper control of the tracing pin 13d so as to release the pin at the time that the dial 1 is lowered and at rest, with the workpiece 2 engaged with the measuring tables 12.

The resultant position of the measuring or gauging tracer 13 may effect a closing of a switch 13a, 13c, or a closing of a switch 13b, 13c, or else such switches may remain open, depending on whether the dimension of the workpiece is oversize, undersize, or the correct size. In order to prevent pitting and deterioration of the switches controlled by the tracer 13d, and to insure the maximum reliability in their functioning such switches are used to control the grid or input circuits of double triode vacuum tubes. One such vacuum tube is illustrated in FIG. 2, being indicated by the numeral 17. A separate vacuum tube 17 is provided for each of the measuring tracers 13, and such tubes are connected in a well known manner with the proper direct current electrical supply means. Such supply means may, for example, constitute a voltage divider 101 connected to the positive and negative terminals P, as shown, of a low-current rectifier network (not shown). The grids 17a and 17b of the vacuum tube 17 are connected through grid resistors 18 and 18a with the lowest position or negative point of the power supply, whereas the anodes 17c and 17d are energized, through relays 19 and 20, from the highest potential or positive point of the voltage source. The common cathode 17e of the tube is connected to an intermediate point of the voltage divider, having a potential somewhat more positive than the negative side thereof. Normally the tube 17 is non-conducting by virtue of the potentials supplied to it, or else is conducting with too low a current to energize the relays 19 and 20 in its load or anode circuits. This presupposes that the cathode of the vacuum tube 17 is not connected with either of the grids 17a or 17b thereof through the associated switches of the tracing or measuring device 13. FIG. 2 the grids are shown as connected with a plug or fitting 13x which in turn is connected with the switch contacts 13a, 13b and 13c of the measuring device 13. The contacts 13a and 13b are for connection with the grids, whereas the contact 13c is for connection with the cathode 17e of the tube. If, as shown in FIG. 2, one of the switches at the tracing or measuring device 13 is closed, thereby causing the cathode 17e and one grid to have the same potential, then that portion of the double triode tube 17 is rendered conducting, and the relay in the load circuit of such portion will be energized. In consequence, relay contacts 19a and 19b or 20a and 20b will be closed for a purpose to be described later. However, the rendering of a portion of the tube 17 conducting may be effected only as permitted by plate or anode double switches 21 and 22, that is, switches which are mechanically coupled for simultaneous operation by a bar 21x, one switch closing when the other closes, and vice versa. The closing of one or the other of such anode circuit switches will condition one triode or the other of the tube 17 for conduction when the tracing or measuring device 13 is actuated to close an associated switch. The anode switches 21, 22 are closed by means of a control disc or cam 123 carried by the control shaft 6; such cam may have an actuating portion 123a which operates the switches 21 and 22 to cause closure of such switches. The control disc or cam 123 and the extent of the active portion 123a thereof is so arranged that the switches 21 and 22 are closed only during the interval that measurements are being performed on the workpieces 2, i.e. the closure occurs shortly after the tracer for the measuring device 13 (or more properly the pin 13d thereof) comes to rest against a workpiece, whereas the opening of the switches 21, 22 is effected shortly before the tracing pin 13d is disengaged from the workpiece 2. There is thus assurance that the tube 17 may be rendered conducting only during the period that the measuring of the workpieces takes place, when the switches 13a, 13c, or 13b, 13c are in condition to be actuated in response to a measurement being performed.

The invention also provides means for automatically feeding the workpieces 2 to the dial 1, and for automatically discharging the workpieces from the dial. The feeding mechanism may include well-known feeding devices, as for example electric vibrators and the like. In the embodiment of FIG. 1 the feeding or loading station is indicated by the letter H, and there is shown at such station a chute or guide means 23 which may be connected with the vibrated or agitated well-known feeding device. A discharge chute 24 is provided at the workpiece discharge station designated by the letter G; such discharge device may be likewise constituted as a chute or channel. Also, mechanical switches or blades 25 and 26 may be arranged at the channel 24, constituting part of the sorting means by which the good or acceptable workpieces are separated from the unsatisfactory pieces. The blades 25 and 26 may be in the form of pivotally mounted vanes as shown. Channels or chutes 27 and 28 may be associated respectively with the vanes or blades 25 or 26, said chutes leading to separate containers in which the workpieces are finally deposited. The discharge of the workpieces 2 from the dial 1 may be effected during the lowering movement of the dial 1, as by arranging a stop 102 which the workpieces strike and which impels them to the chute 24.

The measuring or checking device as illustrated in FIGS. 1 and 2 operates in such a manner that the workpieces 2 which are fed to the dial 1 by means of the channel 23 are positioned in the recesses 1a of the dial whereupon as the dial is given a stepped rotary movement the workpieces traverse successively the measuring stations A, B, C, D, E and F, having a period of rest at each station wherein the gauging or measuring is done, said stepped movement of the dial 1 being effected by the Geneva device illustrated in FIG. 2. At each of the measuring stations A, B etc. a different portion or dimension of the workpiece profile is checked or measured; in the present instance various diameters of the workpiece are checked or gauged.

At the end of the measuring cycle, after the workpieces leave the final measuring station F they travel to the discharge station G, where they are discharged by the stop 102 into the chute 24 for sorting and disposition in one or the other of the containers associated with the channels 27 and 28. The actuation of the switches or vanes 25 and 26, or of additional switches or vanes (hereinafter also called selector devices) associated with other quality grades, is accomplished by a control means which takes into consideration the results of the measurements or gauging which has been done at the individual stations. The determination as to which of the blades 25 or 26 is to be actuated is therefore dependent upon the total or summation of all of the information obtained at the separate measuring stations, i.e. the cumulative result of the various gauging operations, as collected in the storage means, will determine the proper actuation of the blades 25, 26.

In accordance with the present invention the storage of the information obtained in consequence of gauging the workpieces at the different measuring stations and the summation of such stored information for use in connection with the discharge of the workpieces from the dial 1 are effected by the use of an information transmitting device, hereinafter also called an "activating means," associated with each of the measuring stations A to F, said transmitting device or activating means being responsive to the respective measuring or tracing devices 13 disposed at the said stations. Co-ordinated with or under the control of the workpiece carrier plate or dial 1, an information storage means is moved or advanced, to which storage means information regarding the quality of the workpieces is transmitted by the said transmitting or activating means. At the end of the measuring cycle the information which is carried by the information storage means may be utilized or taken off the said means, through the medium of a suitable control mechanism or information-receiving device. Such control mechanism or information receiving device may be made to actuate the selecting means comprising the vanes 25, 26 to sort the workpieces which are discharged from the dial 1.

In the embodiment of the invention illustrated in FIGS. 1 and 2 the information storage means is carried by a special movable carrier constructed in the form of a turnable disc or dial 29. The dial 29 is carried by a shaft 30 the movements of which are synchronized with the movements of the shaft 3 carrying the work mounting dial 1. Coupling of the shafts 3 and 30 may be accomplished in various ways, by well-known means. For example the coupling may be effected by mechanical gears or by a so-called electrical shaft or coupling, or by an electromagnetic-mechanical stepping type of control device. The mode of operation of the latter device, for example, would involve the closing or engaging or contacts in response to turning of the shaft 3, the said contacts in turn effecting the energization of a magnet of a well-known stepping control device which drives the shaft 30. For the purpose of illustrating that any type of suitable coupling may be utilized to effect a synchronized movement of the shafts 3 and 30 there is shown schematically in FIGURE 1 a coupling of the said shafts by means of dotted lines 31 and 32 which are releasably connected to each other by two coupling members 33 and 34, said members being diagrammatically illustrated.

For the purpose of achieving an advantageous construction of measuring device, in accordance with the invention, whereby extremely reliable operation is had without sacrificing simplicity, electromagnets are provided to constitute the information transmitting devices or activating means. This is illustrated in the embodiment of the invention of FIG. 1, the circuit between the switches at the measuring station E and the electromagnet at E being indicated by a broken line 103. Also, the information storage means is constituted of movable parts the positions of which may be changed by energization of the said electromagnets. In the embodiments of the invention illustrated in FIGS. 1 to 5 the said parts are advantageously shown as slides, which may be shifted between two positions, an original or starting position and a shifted or indicating position, the arrangement being such the electromagnets may effect such shifting in an extremely simple manner.

As shown herein, the said electromagnets are indicated by the numerals 351, 352, 353, 354, 355, and 356; referring to FIGURE 1 it is seen that a different one of these electromagnets is coordinated or associated with a different measuring station A to F, corresponding stations and magnets being connected, as the station E and magnet 355 are connected by the line 103. The slides comprising the storage means and which are actuated by the electromagnets are marked 361, 371, 381, 391, 401, and 411 etc. up to 367, 377, 387, 397, 407, 417. The actuation of the said slides is accomplished by shifting them radially inward in response to the energization of the associated electromagnet. For this purpose the magnets are provided with push pins or plungers 351a, etc. up to 356a, which plungers are moved radially inward or toward the shaft 30 as the magnet is energized.

The downwardly directed arrows at the magnets 351, 72 and 73 are connected to one terminal of a power supply whereas the arrows at the relays 19 and 20 are connected to the other terminal of the supply (see FIG. 2). Energization of the said electromagnets is effected in response to closing of the electrical switches 13a, 13c, or 13b, 13c. As already mentioned, the closing of the relay contacts 19b or 20b is the result of such closure of the switches 13a etc. located at the measuring device 13 and the consequent conduction of the vacuum tubes 17 through control of the grid elements thereof. Both of the relay contacts 19b and 20b are connected in parallel and serve as disconnect switches in the supply circuit for the electromagnet 351, so that the said magnet is energized if any one of the contacts is closed. This energization results in the push pin 351a of the magnet moving radially inward or toward the shaft 30, to shift inward the associated slide 361. The work accomplished by the electromagnets 351, 352 etc. to 356 in shifting the associated push pins inward is thus the result of electrical signals, which are under the control of the measuring devices 13 co-ordinated to the individual measuring stations having the measuring tracers.

Controlling electrical signals for the electromagnets may also be provided in any other well known manner, different from that effected by the contact closures which take place at the measuring devices 13. It is essential, however, that the output of any such measuring or control device may be transformed into an electrical signal in some manner, so that the electromagnets 351 etc. may be utilized as the activating means or information transmitting means as above described, thereby to retain the advantages of this type of arrangement.

According to the embodiment of the invention shown in FIGS. 1 and 2 the control of the electromagnets is so arranged that they are energized whenever one of the workpiece being gauged is either oversize or undersize. If, however, the workpiece which is being gauged has been produced in accordance with the pre-arranged tolerances whereby neither of the switches 13a, 13c or 13b, 13c is closed, then the electromagnets are not energized. Thus, as illustrated herein, a sorting of the workpieces is carried out, wherein the good or satisfactory pieces is separated from the unsatisfactory or rejectable pieces. Moreover, a sorting of the workpieces in accordance with various gradations in their measurements may be effected, and to accomplish this at every measuring station a greater number of electromagnets may be provided, to serve as information transmitting or activating devices in a manner explained above. As shown herein each information storage means co-ordinated to a workpiece consists of six parts, i.e. it is composed of six individual slides, as for example the slides 361, 371, 381, 391, 401 and 411. These slides correspond to the six measuring stations marked by the letters A to F. Therefore at each measuring station one certain slide is susceptible of actuation for indicating or storing information. The principle involved with this arrangement of the slides readily enables the workpieces to be sorted in to satisfactory and unsatisfactory lots at the end of the measuring or gauging cycle, as determined by the data obtained at the individual stations.

Contrary to this, if there is only desired a sorting of workpieces into satisfactory and unsatisfactory lots without regard to which individual dimensions may be at fault, a single slide, as for example the slide 36 shown in FIG. 3, may be utilized instead of the six slides 361, 371, etc. to 411. With such arrangement, if the workpiece at one of the measuring places is seen to be outside of the tolerances set, the slide co-ordinated to this measuring station will be actuated causing the workpiece to be discharged into the channel for rejected pieces at the time that it leaves the dial 1. This arrangement of single slides is highly economical and results in the storage of information in the simplest possible manner.

As already described, in the structure shown herein, the information storage means is mounted on a special separate carrier device comprising the disc or dial 29. The information transmitting devices, also called activating means, comprising the electromagnets 351, 352, etc. to 356 are mounted on a stationary supporting frame (not shown herein) provided for the dial 29 and shaft 30. Referring to FIG. 1 the disposition of the electromagnets is such that they are coordinated with the measuring stations A to F and have the same angular displacement. Accordingly, the positions of the electromagnets 351 etc. to 356 are labeled A' to F'.

One particular advantage of the arrangement illustrated in FIG. 1 is that the measuring or checking device is constituted as a separate unit, which is completely separate from the information storing device. Thus, the measuring or gauging device can be utilized in a flexible manner and to the best possible advantage, taking into consideration the particular requirements of the gauging or checking problems. In addition, the measuring or gauging unit and the storage unit may be readily interchanged with other similar units and easily correlated to each other, requiring only the making of the connection 34, 35 in order to insure synchronization of the shafts 3 and 30 as well as effecting the necessary connections between the measuring devices at the various measuring stations and the information transmitting or activating means at the corresponding stations of the storage unit. These electrical connections may be quickly effected in a simple manner, preferably by the use of well-known terminal fittings.

Another possible construction, in accordance with the invention, would be to mount the information storage means on the work carrying dial 1. Such arrangement would result in a structure which is most desirable from the standpoint of economy of manufacture, and is especially advantageous where the storage means comprises relatively few parts, as for example a single slide coordinated to each of the workpieces.

In accordance with the present invention the gauging date which is ascertained and stored during the measuring cycle of the apparatus are utilized by an information-receiving device, also hereinafter termed a "control means," which through the medium of the vanes or blades 25, 26 segregates or sorts the workpieces at the time that they are discharged from the dial 1. As shown in FIG. 1, the said information receiving devices may comprise photoelectric cells, as for example photocells, photoelements or photoresistors. These devices are marked 41 through 46 in FIGURE 1. A well-known light source, not shown for reasons of clarity of illustration, may be co-ordinated to the said photoelectric devices whereby the light from the source may reach and activate said devices when not obstructed by one or more of the slides 361 etc. to 411. The location of the control means comprising the photosensitive devices 41 through 46 corresponds with the discharge station G, at which the discharge chute 24 is located. Accordingly, such location of the said control means is indicated by G'. Furthermore, the storage slides are related to the photosensitive devices in a particular manner, such that the slides 361, 362 etc. to 367 are used to control the light for the photo device 41, the slides 371, 372 etc. to 377 are used to control the light for the photo device 42 and so on; finally the slides 411, 412 to 417 are used to control the light for the photo device 46. In FIGURE 1 the slide 367 is shown as having been shifted radially inward, thus permitting light to pass to the photo device 41, and accordingly the workpiece 2 which is located at the discharge station G will be classified as a rejected piece.

The above mentioned photoelectric devices are of course connected to well known electronic control switches (not shown) which effect a control over the selector devices comprising electromagnets 25a and 26a and the vanes or blades 25 and 26.

Alternatively the information receiving devices or control means may be constituted as mechanical tracing devices. Examples of such construction are illustrated in FIGURES 5, 6, 7 and 8.

Referring to FIGURE 5 this mechanical tracing arrangement is constituted by a movable contact spring or member 48a constituting a part of an electrical switch 48, which is disposed in the path of movement of a shiftable slide 47 constituting a portion of the information storage means mounted on the dial 29. The contact spring 48a is cooperable with a stationary contact 48b of the switch 48. If, during the advancing movement of the dial 29 the slide 47 should be in outwardly extended position as shown, it will strike the contact spring 48a, shifting the latter into engagement with the cooperable contact 48b. The switch 48 is connected in the supply circuit for an electromagnet 49 which serves as an information-transforming device. The magnet 49 has a push pin or plunger 49a engageable with a projection 50a of a shiftable vane or blade 50 which is pivotally mounted on a spindle 51. The blade 50 determines the path which the workpiece takes in the bifurcated channel or chute 53. Actuation of the blade 50 by the electromagnet 49 is effected against the action of a return spring 53 which normally holds the blade 50 in the full line position shown in FIG. 5. For the purpose of maintaining the blade 50 in the dotted line position shown as effected by energization of the magnet 49 until the workpiece has traversed the bifurcated chute 52, the energization of the magnet 49 may be prolonged by a well-known holding type of relay which, independently of the angular position of the dial 29 maintains the electromagnet 49 energized for the necessary interval of time. The relative disposition of the switch 48 and electromagnet 49 is quite flexible, since only one electrical connection need be effected between the said components.

A type of information receiving or control means which is especially simple in its construction, requiring few components, is illustrated in FIGURE 6. Here a slide 54 is provided on the dial 29 and adapted to engage and cooperate with a projection 50a carried by the shaft 51 which mounts the selector blade 50. In order to insure that the blade 50 remain in the dotted line position for a sufficient interval of time, the slide 54 is provided with a lateral extension 54a which, during a predetermined advancing movement of the dial 29 maintains the blade 50 in its displaced position against the action of the return spring 53.

In FIGURES 5 and 6 the arrangement of the slides 47 and 54 is illustrated schematically only; particularly there is omitted the means by which the slides are shifted between their operative and inoperative positions. In the illustrations the arrangement is such that the slides 47 and 54 must be shifted radially outward in order to effect actuation of the blade 50.

As provided by the invention, the arrangement and actuation of the storage slides carried by the dial 29 are shown in FIGS. 3 and 4. In FIG. 3 an electromagnet 35 is illustrated, having a push pin or plunger 35a in an arrangement corresponding to that shown in FIG. 1. In FIG. 3 there is shown a slide 36, movably mounted on the storage means carrier or dial 29. The mounting of the slide 36 is effected by means of a pin and slot connection, the slide having a longitudinal slot 36a through which a pin 55 extends, the said pin being rigidly secured to the dial 29.

The pin 55 carries a leaf spring 56 which presses against the slide 36 and tends to hold the same down, flat against the top surface of the dial 29.

Other well known straight guiding means may be further provided to mount the slide 36 on the dial 29, in addition to the slot mounting of the slide 36, such guiding means being omitted for the sake of clarity. As shown in FIG. 3 a helical compression spring 58 is provided, engaging an abutment or shoulder 57 on the dial 29, said spring biasing the slide 36 in a radially outward direction. At the underside of the slide 36 there is provided a notch 36b having a cam surface and also a rectangular recess. The notch 36b cooperates with a rectangular projection 29a rigidly secured to the dial 29. When the slide 36 is shifted radially inward by the electromagnet 35, the cam surface of the notch 36b rides over and past the projection 29a and the latter is accommodated in the rectangular recess of the slide, thereby to retain the same in the inwardly shifted position as shown in FIGURE 4. For such position the compression spring 58 is compressed as indicated, and is charged in readiness for returning the slide to its original outwardly extending position shown in FIG. 3. Such inward position of the slide 36 corresponds to the inwardly shifted position of the slide 367 disposed opposite the photosensitive element 41 as shown in FIGURE 1.

In order to effect a return of the slides to their original positions after the stored information has been made use of, thereby to reset the slides for subsequent use I provide a reset device adapted to engage and cooperate with the slide 36 as the dial 29 continues its advancing movement. This reset device is illustrated in FIG. 4, and comprises a fixed stop or abutment 59, provided with a sloping cam edge 59a. Considering movement of the dial 29 in the direction of the arrow in FIG. 4, when the retracted slide 36 strikes the stop 59 the slide will be lifted by the camming edge 59a thereof against the holding down action of the spring 56. Thus, the projection 29a of the dial will be disengaged from the rectangular recess in the underside of the slide 36, whereupon the return spring 58 will become operative to again extend the slide 36 to its outermost or original position as illustrated in FIG. 3.

The reset station at which the reset member 59 is disposed corresponds to the work feeding station H of the dial 1, and accordingly such reset station is designated by H' in FIGURE 1, adjoining the dial 29. Accordingly, it is seen that the measuring or gauging unit has the same number of measuring units as there are stations provided for the storage unit shown in the lower portion of the figure.

Instead of the slides 36, 361, 371, etc. which constitute the storage means there may be provided levers which are shiftable between two positions. Such levers could for example be constituted as tipping levers which are firmly supported against the top surface of the dial 29 in each of the two shifted positions thereof. With this organization the provision of an additional locking device is unnecessary, to secure the levers in their shifted positions.

Another construction of mechanically operable storage device is illustrated in FIGS. 7 and 8. In these figures the storage device is constituted as a band or flexible strip, in which holes can be punched by means of the electromagnets which constitute the activating means. This band or strip is indicated by the numeral 60 and may be unwound from a storage coil 61 and reeled up on a takeup spool 62. The band 60 is advanced over toothed rollers 63 which engage perforations 60a (FIG. 8) provided along both edges of the band. One of the toothed rollers 63 is driven by a drive wheel 64 which in turn is synchronized with the movements of the workpiece carrier or dial 1. At each of the stations A' to F' electromagnets 351, 352, etc. to 356 are arranged. Moreover, at these stations the band 60 passes over supporting members or tables 651, 652 etc. to 656, which have recesses for receiving push pins 351a, 352, etc. to 356a of the electromagnets. As determined by the gauging data or information obtained at the respective measuring stations A to F, the respective magnets 351, 352 etc. are energized or not energized. When such magnets are energized a hole is punched in the band 60 by means of the associated push pins of the electromagnet. This punched hole may have a round or polygonal cross-section or configuration. In FIG. 8 the punched hole 60b is shown as being of rectagular configuration.

Also, in accordance with the embodiment of the invention in FIGS. 7 and 8 the information receiving means or control means may be in the nature of a mechanical tracing member. For this purpose a contact spring 66 is provided adapted to be engaged with a grounded table 67 to effect electrical connection thereto. Such engagement may occur through a punched hole 60b in the band 60, as will be readily understood. Thus, the switch comprising the members 66 and 67 serves the same purpose as the switch 48 shown in FIGURE 5.

As schematically illustrated in FIGURE 1 the tracing of the band 60 may be effected by means of photoelectric devices instead of the mechanical tracing device comprising the mechanically movable contact member 66.

Another construction of information storage means as provided in accordance with the invention is illustrated in FIGURE 9. As shown therein, the information storage means comprises an endless magnetic band 68 which, like the band 60 shown in FIGS. 7 and 8, is advanced by means of toothed rollers 63. Also, the motivation of the band is accomplished in the same way as that shown in FIGURE 7, i.e. through the medium of a driving wheel 64. Information-transmitting devices or activating means are provided in the form of transducer heads 691, 692, etc. to 696, said heads being arranged so that they may be electromagnetically energized or rendered operative, as for example in response to the closing of the switches in the tracing or measuring devices 13. Also, the transducer head 70 is provided, constituting the information-receiving device or control means which responds to the data stored on the band 68. Further, I provide an erasing head 71 by which the data carried by the band 60 is obliterated after use has been made of the same. The construction and functioning of the transducer heads 691, 692, etc. to 696 as well as the heads 70 and 71 and the band 68 do not require a detailed explanation herein, as details thereof are sufficiently well known in the art relating to tape recorders. For the purpose of obtaining information regarding the quality of a certain quantity of workpieces independently of the sorting of the same upon their being discharged from the dial 1 there is further provided by the invention one or more counters, preferably of the electromagnetic kind, which are co-ordinated to each of the measuring stations A through F.

Such counters are schematically illustrated in FIGURE 2, and are indicated by the numerals 72 and 73; they may be activated by the relay contacts 19a and 20a as shown. By such organization, when a workpiece exhibits an oversize or undersize dimension one of the counters 72, 73 will be actuated, advancing the count thereof to the next figure whereby the number of defective parts will be totalized. Moreover, by the provision of other, similar counting devices, the number of good or acceptable workpieces may be counted and totalized. Aside from the foregoing, more than the two counters shown could be co-ordinated to each of several measuring stations, according to the number of quality grades of a workpiece which are to be gauged at the said measuring station. By thus summarizing the gauging of the workpieces at a single measuring station the statistical overall quality of a quantity of workpieces may be perceived at a glance.

The foregoing arrangement of counters thus provides detailed information regarding the quality of the workpieces, even when there is a final sorting of the same into satisfactory and unsatisfactory lots. Furthermore, depending on the results indicated by the counters, production corrections and adjustments may be made, or corrections may be automatically effected as determined by the measuring devices or measuring tracers or determined by the indications of the counters, through the application of well-known transmitting and piloting means.

The operation of the apparatus as above described and constructed in accordance with the invention is as follows:

Workpieces 2 which are to be measured or gauged are brought to the dial 1 by means of an automatic feeding device connected with the feed chute 23. The dial 1 carries the workpieces in a progression so that they traverse the measuring stations from A to F one station after another, the movement of the dial being a stepped movement whereby the workpieces remain at rest for a predetermined interval at each measuring station. At the measuring stations A to F certain measurements or gauging operations are performed. The results of such measurements are conveyed to the information storage means or slides 361, 362 etc. by information transmitting devices comprising, for example, the electromagnets 351, 352, etc. The information storage means is advanced in the same direction and manner as the dial 1 and workpieces 2 carried thereby, in synchronism with the same. Thus, as each measurement or gauging operation is performed the storage of such information is effected at a storage station which corresponds to the measuring station. The storage of such information is effected in the manner previously described, by either moving a slide or shifting a lever, or punching a hole in the band or by magnetizing certain portions of a magnetic band.

When a workpiece has traversed all of the measuring stations the measuring or gauging cycle is completed, with the workpiece being discharged at the next control or rest position of the work carrier dial 1. Such discharge of a workpiece for example may be effected by means of a gripping arm which engages and removes the piece, or by an air blast or any other suitable device. Instead of the workpieces being discharged at one position they may be discharged at any of a number of different positions, and thus each such discharge position may correspond to a certain quality or grade work. However, by the provision of the single discharge station, as shown in the illustrated embodiments of the invention the apparatus is utilized to the greatest extent and with maximum efficiency as then a maximum number of gauging operations may be performed in the smallest possible space, and with the least amount of time.

The sorting of the workpieces which are discharged from the dial 1 into satisfactory and unsatisfactory lots or according to various quality grades is effected by well-known sorting devices, as for example movable blades or vanes which either obstruct or provide free passage along channels or chutes leading to various containers for the work. The actuation of these vanes or blades or other sorting devices is made responsive to the "information picture" or "measuring picture" which is carried by the information storage means for each particular workpiece. The information receiving device or control means which actuates the selector or sorting devices is disposed in a position corresponding to the discharge station provided at the work carrying dial 1. Immediately upon the storage means attaining this position the "measuring picture" is taken off or utilized by the control means or information receiving device so that at the beginning of the discharge of the workpiece the actuation of the selector or sorting devices has already been accomplished, these being placed in the desired or required positions before the workpieces confront them.

After a workpiece has been discharged from the dial 1, and as the evacuated nest or recess 1a of the dial is brought again to the loading station H another workpiece 2 is fed into the recess, and during such advance of the dial 1 the corresponding advancing movement of the carrier for the storage means to the station H' results in the repositioning or resetting of the storage means so that it is again conditioned for the storage of new information. Such resetting may for example involve return movement of the slides or levers comprising the storage devices, or erasing of the magnetic band 63. Thus there is started a new measuring or gauging cycle, and in the illustrated embodiments of the invention such cycle is commenced and also another cycle ended with every stepped advance movement of the dials 1 and 29.

The illustrated embodiments of the invention show various kinds of information storage devices or means. All of the special advantages effected by the invention are obtainable with each one of the illustrated storage devices, as well as with other storage devices not disclosed but constructed in accordance with the same principles. In each case, the progression of a workpiece through a measuring cycle is co-ordinated with a similar progression of an information storage means through a corresponding cycle, thereby resulting in a storage apparatus or unit which is virtually trouble free, relatively simple in construction, capable of visual data, and economical to fabricate.

Complicated banks of relays, electrical storage means involving costly components and assemblies, and complicated and extensive circuits and connections as currently employed with well-known measuring and information storing device are completely eliminated by the present invention with the provision of the apparatus illustrated and described herein.

By the provision of the present improved and simplified storage means having movable parts which are shiftable between two extreme positions as provided by the slides or levers described herein it is seen that the invention provides for the storage of information through the use of basic mechanical elements which are extremely reliable in their operation, as is universally recognized. It is seen that such mechanical storage means involves small expense as regards components and materials, thereby enabling a desirable economy to be effected in the manufacture of the apparatus.

As described above, by the provision of a band or flexible strip into which holes may be punched by means of electromagnets there is effected a storage and information means which involves but little expense and makes possible the obtaining of records involving the measuring and gauging of workpieces, which may be preserved and utilized at any later time, as desired. Likewise, a magnetic band could be used as a storage means for obtaining records which are to be considered at a later time. However, such arrangement would involve a greater cost than the perforated band 60 shown in FIGS. 7 and 8, and which could for example be a band constituted of paper.

By the provision of the magnetic band 68 as illustrated in FIG. 9 a storage means is obtained which is not subject to mechanical wear, however, and accordingly such record remains constant even though continually used.

It is to be further pointed out that the structures as illustrated in FIGS. 7, 8 and 9 are saving of space, and adaptable and conducive to the fabrication of storage units having small dimensions. Accordingly, where such arrangements are utilized the storage means is preferably associated with a separate, special carrier device.

In addition to the foregoing there is a further advantage in providing a special, separate carrier for the information storage means in that an information receiving device or control means which is adapted to handle a certain maximum number of measuring stations could be coupled without difficulty to devices having a lesser number of measuring stations. The locations or stations of the information storage means which are not used could be easily overlapped in a simple manner by the provision of a connection between the work carrying dial 1 and the storage means carrying dial 29, such connection involving a so-called "electrical shaft" or an electromagnetic stepping-type drive.

By reason of the simple and easily viewed and understood mode of operation of the present measuring and sorting apparatus as provided by the invention, and by reason of the simple and clearly arranged structure of such apparatus the production and use of such measuring and sorting equipment could involve appreciable quantities, characterized by relatively low cost, whereby the fabrication and testing of such equipment, as well as the operation thereof may be carried out by personnel which need not be especially trained.

I claim:

1. A device for measuring and sorting workpieces and the like, comprising a movable carrier adapted to carry said workpieces in a progression for traversing a plurality of measuring stations one station after another; a measuring device at each measuring station, adapted to measure dimensions of said workpieces; information storage means, movable with said workpiece carrier; means for activating said storage means in accordance with the responses of the respective measuring devices to the workpieces, said activating means being associated with the measuring stations and measuring devices thereof; a control means adapted to be operated by said storage means after the latter has been activated at the end of traversal of the measuring stations by each workpiece; and a selector device actuated by said control means for directing workpieces to one of a predetermined number of locations after discharge of the workpieces from the movable carrier subsequent to their measurement.

2. The invention as defined in claim 1, in which the information storage means is disposed adjacent the said movable carrier, said storage means and carrier being moved concurrently.

3. The invention as defined in claim 1, in which there is a separate movable carrier for the said information storage means, said separate carrier moving in synchronism with the movable carrier for the workpieces, in which there is a fixed supporting frame for the said separate carrier, said frame mounting the means which activates the storage means and also mounting the said control means, said activating means being coordinated to the measuring stations and being operable in the same sequence that the said stations are traversed by the workpieces, said activating means being connected respectively with the measuring devices at the associated measuring station.

4. The invention as defined in claim 1, in which the measuring devices comprise electrical switches adapted to control electric signals, in which the said activating means comprise electromagnets connected to be under the control of said switches, and in which the storage means comprises a plurality of portions adapted to be changed by the said electromagnets.

5. The invention as defined in claim 4, in which the said storage means comprise slides each mounted for movement between two positions in either of which the slides may remain, and in which the said electromagnets are adapted to shift the slides from one position to another.

6. The invention as defined in claim 5, in which there are means cooperable with the said slides for automatically shifting the latter from the positions effected by the electromagnets to the other positions after the actuation of the selector device by the said control means.

7. A device for measuring and sorting workpieces and the like, comprising a movable carrier adapted to carry said workpieces in a progression for traversing a plurality of measuring stations one station after another; a measuring device at each measuring station, adapted to measure dimensions of said workpieces; information storage means, movable with said workpiece carrier; means for activating said storage means in accordance with the responses of the respective measuring devices to the workpieces, said activating means being associated with the measuring stations and measuring devices thereof; a control means adapted to be operated by said storage means after the latter has been activated at the end of traversal of the measuring stations by each workpiece; and a selector device actuated by said control means for directing workpieces to one of a predetermined number of locations after discharge of the workpieces from the movable carrier subsequent to their measurement, said measuring devices comprising electrical switches adapted to control electric signals, said activating means comprising electromagnets connected to be under the control of said switches, said storage means having a plurality of portions adapted to be altered by said electromagnets and the control means comprising a mechanical tracing device adapted to operate the said selector device.

8. The invention as defined in claim 7, in which for effecting a control of the said selector device the tracing device has at least one movable part constituting an electric switch, and in which the selector device includes an electromagnet controlled by the said switch.

9. The invention as defined in claim 4, in which the control means comprises a source of light and photoelectric devices adapted to respond to light from said source.

10. The invention as defined in claim 1, in which the information storage means comprises an endless magnetic band, in which the said activating means comprises transducer heads adapted to magnetize the said band, and in which the control means includes a transducer head for picking up signals from the said band, said heads being adapted for electrical energization, and in which there is an erasing head disposed between the transducer head constituting the control means and the first transducer head of the said activating means, for the purpose of erasing the signals on the magnetic band.

11. The invention as defined in claim 1, in which there are counters arranged at each of the measuring stations, adapted to be controlled by the measuring devices thereof.

12. A device for measuring and sorting workpieces and the like, comprising a movable carrier adapted to carry said workpieces in a progression for traversing a plurality of measuring stations one staion after another; a measuring device at each measuring station, adapted to measure dimensions of said workpieces; information storage means, movable with said workpiece carrier; means for activating said storage means in accordance with the responses of the respective measuring devices to the workpieces, said activating means being associated with the measuring stations and measuring devices thereof; a control means adapted to be operated by said storage means after the latter has been activated at the end of traversal of the measuring stations by each workpiece; a selector device actuated by said control means for directing workpieces to one of a predetermined number of locations after discharge of the workpieces from the movable carrier subsequent to their measurement, said measuring devices comprising electrical switches adapted to control electric signals, said activating means comprising electromagnets connected to be under control of said switches, said storage means comprising a plurality of slides adapted to be shifted by the said electromagnets, each slide being mounted for movement between two positions in either of which the slide may remain, the electromagnets being adapted to shift the slides from one position to another; means cooperable with said slides for automatically shifting the latter from the positions effected by the electromagnets to the other positions after the actuation of the selector device by the said control means; spring means for shifting the slides to the said other positions; releasable locking devices for holding the slides in the positions to which they are shifted by the electromagnets; a separate movable carrier which mounts the said storage means; and a fixed abutment engageable with the slides for releasing the locking devices associated with the slides as the separate carrier continues to move, subsequent to actuation of the selector device by the control means.

13. A device for measuring and sorting workpieces and the like, comprising a movable carrier adapted to carry said workpieces in a progression for traversing a plurality of measuring stations one station after another; a measuring device at each measuring station, adapted to measure dimensions of said workpieces; information storage means, movable with said workpiece carrier; means for activating said storage means in accordance with the responses of the respective measuring devices to the workpieces, said activating means being associated with the measuring stations and measuring devices thereof; a control means adapted to be operated by said storage means after the latter has been activated at the end of traversal of the measuring stations by each workpiece; a selector device actuated by said control means or directing workpieces to one of a predetermined number of locations after discharge of the workpieces from the movable carrier subsequent to their measurement, said measuring devices comprising electrical switches adapted to control electric signals, said activating means comprising electromagnets connected to be under the control of said switches, said storage means comprising a flexible strip adapted to have holes punched in it by the said electromagnets.

14. The invention as defined in claim 7, in which the tracing device includes a movable projection, and in which the selector device comprises a vane directly connected to the said projection.

15. The invention as defined in claim 14, in which there is a separate movable carrier moving concurrently with the carrier for the workpieces, and in which the storage means includes storage parts movably mounted on said separate carrier and engageable with the said mechanical tracing device, said vane being held in its operative position by the said movable projection for a minimum length of time during the cycling movement of the said separate carrier.

References Cited in the file of this patent

UNITED STATES PATENTS

| | | |
|---|---|---|
| 1,234,434 | Winkley | July 24, 1917 |
| 1,406,193 | Kent | Feb. 14, 1922 |
| 1,443,193 | Phelps | Jan. 23, 1923 |
| 1,465,369 | Simmons | Aug. 21, 1923 |
| 1,580,955 | Burdick | Apr. 13, 1926 |
| 1,645,118 | Seabright | Oct. 11, 1927 |
| 2,390,012 | Timm et al. | Nov. 27, 1945 |
| 2,384,518 | Aller | Sept. 11, 1945 |
| 2,592,157 | Kendall | Apr. 8, 1952 |
| 2,601,154 | Krueger | June 17, 1952 |
| 2,609,928 | Doust | Sept. 9, 1952 |
| 2,717,693 | Holmes | Sept. 13, 1955 |